(12) United States Patent
Wade

(10) Patent No.: US 7,128,832 B2
(45) Date of Patent: Oct. 31, 2006

(54) FILTER PIT

(76) Inventor: Rodney George Wade, 148 Wongawallen Drive, Upper Coomera, Queensland, 4210 (AU)

( * ) Notice: Subject to any disclaimer, the term of this patent is extended or adjusted under 35 U.S.C. 154(b) by 0 days.

(21) Appl. No.: 10/688,887

(22) Filed: Oct. 21, 2003

(65) Prior Publication Data

US 2005/0082212 A1 Apr. 21, 2005

(51) Int. Cl.
*E03F 5/14* (2006.01)
(52) U.S. Cl. .................... 210/155; 210/162; 210/170; 210/339; 210/474
(58) Field of Classification Search ................ 210/155, 210/162, 163, 164, 170, 335, 339, 455, 474, 210/477, 489
See application file for complete search history.

(56) References Cited

U.S. PATENT DOCUMENTS

| 587,438 | A | * | 8/1897 | Irwin ......................... 210/477 |
| 1,041,887 | A | * | 10/1912 | Schodde ...................... 210/163 |
| 1,556,913 | A | * | 10/1925 | Mario ......................... 210/339 |
| 5,223,154 | A | * | 6/1993 | MacPherson et al. ....... 210/155 |
| 5,405,539 | A | * | 4/1995 | Schneider .................... 210/170 |
| 5,788,849 | A | * | 8/1998 | Hutter et al. ............... 210/163 |
| 6,217,757 | B1 | * | 4/2001 | Fleischmann ............... 210/163 |

* cited by examiner

*Primary Examiner*—Christopher Upton
(74) *Attorney, Agent, or Firm*—Millen, White, Zelano & Branigan, P.C.

(57) ABSTRACT

A filter pit is disclosed. The pit has an inlet and an outlet adjacent a base of the pit. A primary, a secondary and a tertiary filter are located between the inlet and outlet and the tertiary filter is supported above the base and is able to dry out when the flow of water through the pit ceases.

11 Claims, 2 Drawing Sheets

FILTER PIT

BACKGROUND OF THE INVENTION

This invention relates to a filter pit. In particular, the invention concerns a filter pit normally situated below ground and used to filter water collected from a catchment area and for directing the water to a storage tank.

In a typical water catchment, storage and distribution system, water is collected in a catchment area such as the roof of a building and directed to an in-ground filter pit by roof gutters and downpipes in which debris is removed from the water. The filtered water is directed from the filter pit and either directly to a storage tank or into the tank via a first flush water diverter. The water within the tank may then be distributed for consumption or use and is either pumped from the tank for immediate use or is pumped from the storage tank to a header tank from which it is then distributed for consumption/use.

Filter pits are usually constructed from plastic or concrete but plastic is preferred. The pit has one or more inlets adjacent an upper region of the pit and one or more outlets through which water may pass. The pit has a removable cover and a screen is located within the pit and water must pass through the screen as it travels from the inlet/s to the outlet/s. Typically, the screen has a mesh size of about 955 microns. A junk basket is suspended above the screen and is effective in preventing the passage of larger debris. Typically the junk basket has 6 mm apertures.

The pits are constructed in two sizes; 700 mm×700 mm×700 mm and 560 mm×560 mm×510 mm.

In the present water catchment, storage distribution systems and filter bags made of suitable material are positioned within the tank and are adapted to filter out fine particles of a size which pass through screen and junk basket from in the tank.

These filter bags were suspended within the storage tank and often were immersed in the water within the tank. In such cases, not only did the filter bag remain wet, the fines trapped by the bag were able to decompose and leach into the water in the tank and thereby contaminate the water.

OBJECT OF THE INVENTION

It is an object of the invention to provide a filter pit for filtering water collected from a catchment area and for directing the water to a storage tank which at least minimises the disadvantage referred to above.

SUMMARY OF THE INVENTION

According to one aspect of the invention there is provided a filter pit for receiving water from a catchment area and for directing the water to a storage tank, the pit having at least one inlet adjacent an upper portion of the pit, at least one outlet for water adjacent a floor of the pit, a primary filter within the pit and between the inlet and the outlet, a secondary filter within the pit and located to receive water which passes through the primary filter, a tertiary filter within the pit and located between the outlet and the secondary filter to receive water from the secondary filter whereby progressively smaller particles are filtered from the water and water may drain from the pit and the tertiary filter being supported spaced from the base of the pit is able to dry out when the flow of water through the pit ceases.

The primary filter may consist of a screen or basket adapted to filter relatively large particles from the water.

Preferably the primary filter has apertures of approximately 5.5 mm in size. The primary filter may rest upon and have a filtering zone spaced from the secondary filter.

The secondary filter may be supported within the pit by a baffle extending part way across the pit. The secondary filter may consist of a screen having apertures of approximately 955 microns in size.

The tertiary filter is supported in a suspended manner below the secondary filter. The tertiary filter may be attached to a carrier which in turn is supported by or attached to the baffle.

The pit may have a removable lid adapted to seal the pit and prevent the entry of vectors or vermin into the pit.

The tertiary filter is maintained above the floor of the pit and/or above the lowest point from which water is withdrawn from the pit by the outlet/s. Preferably, the outlet/s are flush with the floor of the pit so that once no further water enters the pit through the inlet/s, the outlet/s function to allow all the water to escape from the pit. In this way the tertiary filter is able to dry out and does not suspend fines in water from which they may leach for any appreciable length of time.

The storage tank typically has an overflow outlet open to the atmosphere and allows an airspace to develop above water within the tank. The inlet/s to the pit communicate with the atmosphere via the downpipes and gutters of the catchment area or roof from which water is collected. The pit is at a height above the storage tank and in view of this configuration, when water ceases to flow through the pit there is a natural flow of air from the tank, through the pit and through the downpipes and this assists in allowing the drying out of the tertiary filter.

The pit may have a tapered wall and has a larger transverse cross sectional area in an upper region thereof than in a lower region thereof. Preferably a peripheral wall of the pit has steps along its height such that a plurality of like pits may nest relative to each other for ready transportation and storage purposes.

An upper edge of the pit has a lid receiving lip formed thereon.

Where circumstances dictate a first pit may have a portion of a lower part thereof cut therefrom and the remaining part of the first pit may nest relative to an upper part of a second pit and may be sealed relative to each other to provide a combined pit of a depth suited to a particular installation.

SUMMARY OF THE DRAWINGS

A preferred embodiment of the invention will now be described by way of example with reference to the drawings in which:

FIG. 1 shows a building 10 with a roof 11 which forms a catchment area for rainwater. Gutters 12 collect the water and downpipes 13 direct the water to a pipe 14 which in turn directs the water to a filter pit 15. The pit 15 is partially buried in the ground. Water from a lower part of the pit is coupled by pipe 16 to a first flush water diverter 17 and from there the water passes into storage tank 18. The tank 18 has an overflow outlet 18a. A pump (not shown) is able to transfer the water to a header tank 19 from which the water may be withdrawn for use.

Figure 1:
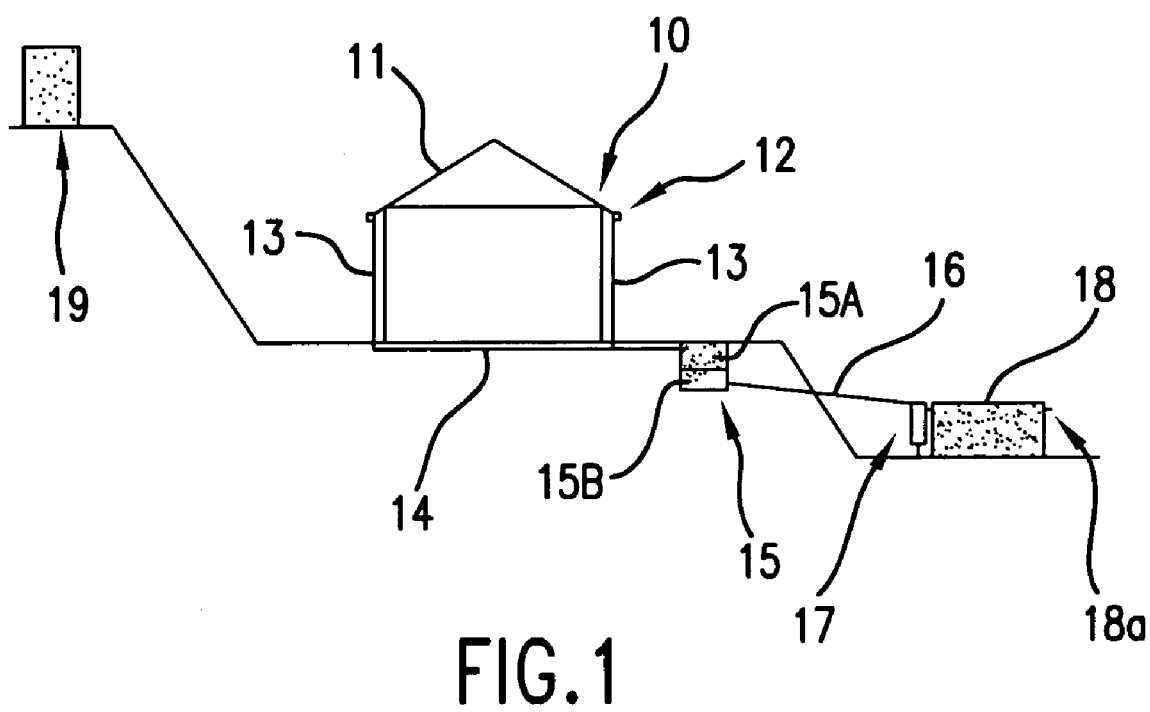
FIG. 1 is a diagrammatic elevational view of a typical water catchment, storage and distribution system having a filter pit according to an embodiment of the invention; and, FIG. 2 is a sectional view of a filter pit according to an embodiment of the invention.

Pit 15 has a peripheral wall 21 with a tapered stepped configuration with steps 22, 23 along its height. A lid receiving lip 24 is present at an upper part of the wall 21. If pit 15 is used on its own a lid (like lid 25) may be positioned over lip 24 and an inlet opening 26 may be cut through the wall 21 in the position shown.

An outlet 27 is present at the very bottom of the pit and is in line with the base wall 28 of the pit. This allows the pit to be completely drained of water.

A baffle 30 is located within the pit 15 and at a predetermined height within the pit. The baffle extends inwardly and has a central hole. A carrier 31 may rest on the baffle 30 and passes through the hole. As is clear in FIGS. 1 and 2 the baffle 30 divides the filter pit 15 into an upper chamber 15A and a lower chamber 15B so as to separate filtered water from unfiltered water.

The carrier 31 has an upper lip 32 and a frusto-conical wall 33 which extends through the central hole. A tertiary filter 35 or filter bag is attached to the lower extremity of the wall 33. The tertiary filter may be made from a geo-textile material having apertures of approximately 5 micron size that filters the water to eliminate particles down to a 5 micron size.

A secondary filter 37 having a lip 38 and a downwardly extending tapered wall 39 with a filter screen 40 extending across the lower extremity of the wall 39 is shown resting upon lip 32 and is ultimately also supported by the baffle 30.

Filter screen 40 may have 955 micron apertures. A primary filter 41 rests upon lip 38. Primary filter 41 may function to separate relatively large size debris from the water.

Figure 2:
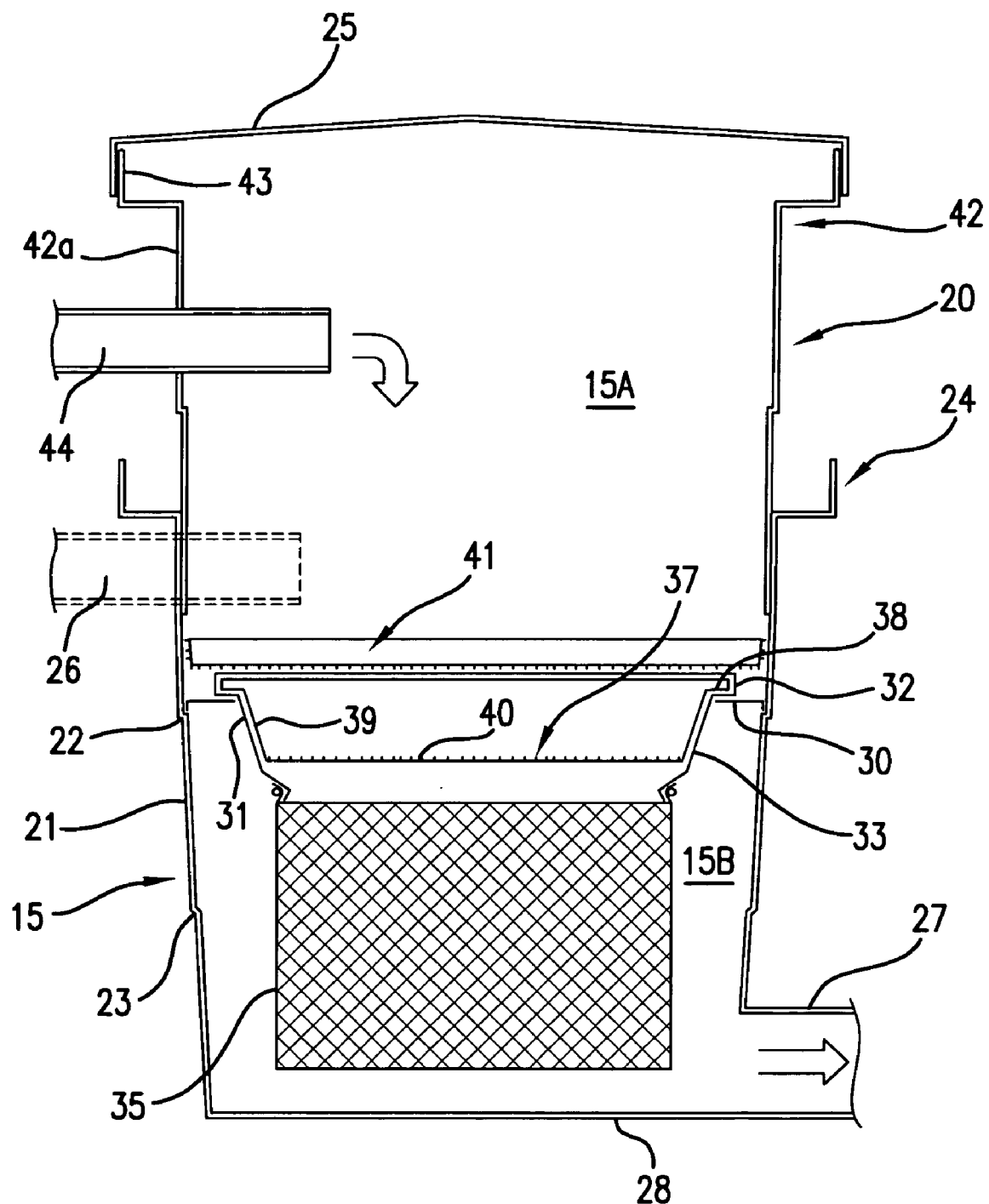
FIG. 2 shows detail of a filter pit 15 according to an embodiment of the invention. Where circumstances dictate and depending upon levels at which the various components of the storage and distribution system are located, it may be necessary to locate the pit deeper in the ground. In such an instance, a second filter pit 20 with a lower portion removed is nested relative to pit 15. The second pit 20 does not have filter components like that carried by pit 15.

In FIG. 2 ground level may be at the location indicated by the numeral 42. In which case water is not introduced into pit 15 at an inlet opening 26. Rather, a pit 20 without the filters of pit 15 and without the baffle 30 is employed has a portion cut from its lower part to provide a completely open base.

Pit 20 has a frusto-conical stepped peripheral wall 42a and a lip 43 extending around an upper edge of the wall 42. A lid 25 is received over lip 43 and seals off the combined pit consisting of pits 15 and 20. An inlet opening 44 is formed in the wall 42a. Wall 42a is sealed relative to wall 21 in any suitable manner.

The pit of the invention combines a series of filters, one of which, the tertiary filter is a filter bag, in a single unit that is able to drain out and dry out after rain. Filter bags that remain wet are a haven for bacteria growth and allow the bacteria to infiltrate into the water to be stored in the storage tank. This is not possible with the pit of the invention. The filters when used in the manner of the invention reduce coliforms and turbidity in the water stored in the storage tanks.

Maintenance of the pit requires removal of the lid, removal and periodic cleaning of the primary, secondary and tertiary filters and then reinstallation of the filters and lid.

I claim:

1. A filter pit for receiving water from a catchment area and for directing the water to a storage tank, the pit having a peripheral wall, at least one inlet adjacent an upper portion of the pit and at least one outlet for water adjacent to a floor of the pit; a baffle inside the pit extending inwardly from the peripheral wall separating the pit into upper and lower chambers, a primary filter removably resting within the pit and located above the baffle, a carrier removably received and resting on the baffle and having a lower portion and an upper portion; a secondary filter within the pit at a location below the baffle, the secondary filter being received by the carrier and held above the lower portion of the carrier, the secondary filter receiving water which passes through the primary filter, a tertiary filter within the pit and secured to the lower portion of the carrier to suspend the tertiary filter from the carrier and to hold the tertiary filter above the floor of the pit, the tertiary filter receiving water from the secondary filter, the baffle being located between the primary filter and the floor of the pit, whereby progressively smaller particles are filtered from the water and drains from the pit through the outlet with the tertiary filter, which tertiary filter is supported in spaced relation above the floor of the pit to dry out when water flow through the pit ceases.

2. The filter pit of claim 1 wherein the primary filter consists of a screen.

3. The filter pit of claim 2 wherein the screen has apertures of approximately 5.5 mm in size.

4. The filter pit of claim 3 wherein the primary filter rests above and has a filtering zone spaced from the secondary filter.

5. The filter pit of claim 1 wherein the secondary filter has a screen with apertures of approximately 955 microns in size.

6. The filter pit of claim 1 wherein the tertiary filter has apertures approximately 5 micron in size.

7. The filter pit of claim 1 having a tapered peripheral wall.

8. The filter pit of claim 7 wherein the peripheral wall is stepped.

9. The filter pit of claim 7 wherein the peripheral wall has a lip at an upper end and a lid is received over the lip.

10. The filter pit of claim 9 wherein the peripheral wall is stepped.

11. The filter pit of claim 1 wherein the tertiary filter is bag filter.

* * * * *